(No Model.) 6 Sheets—Sheet 1.
H. B. COLLINS.
DYNAMIC ELECTRIC HEATER.

No. 527,050. Patented Oct. 9, 1894.

WITNESSES:
H. E. Chase,
L. Schoeneck.

INVENTOR
Herman B. Collins
BY
Heys Wilkinson Parsons
ATTORNEYS.

(No Model.) 6 Sheets—Sheet 3.

H. B. COLLINS.
DYNAMIC ELECTRIC HEATER.

No. 527,050. Patented Oct. 9, 1894.

WITNESSES:
H. C. Chase,
C. Schoenck.

INVENTOR
Herman B. Collins
BY
Wilkinson Parsons
ATTORNEYS.

(No Model.) 6 Sheets—Sheet 4.
H. B. COLLINS.
DYNAMIC ELECTRIC HEATER.
No. 527,050. Patented Oct. 9, 1894.
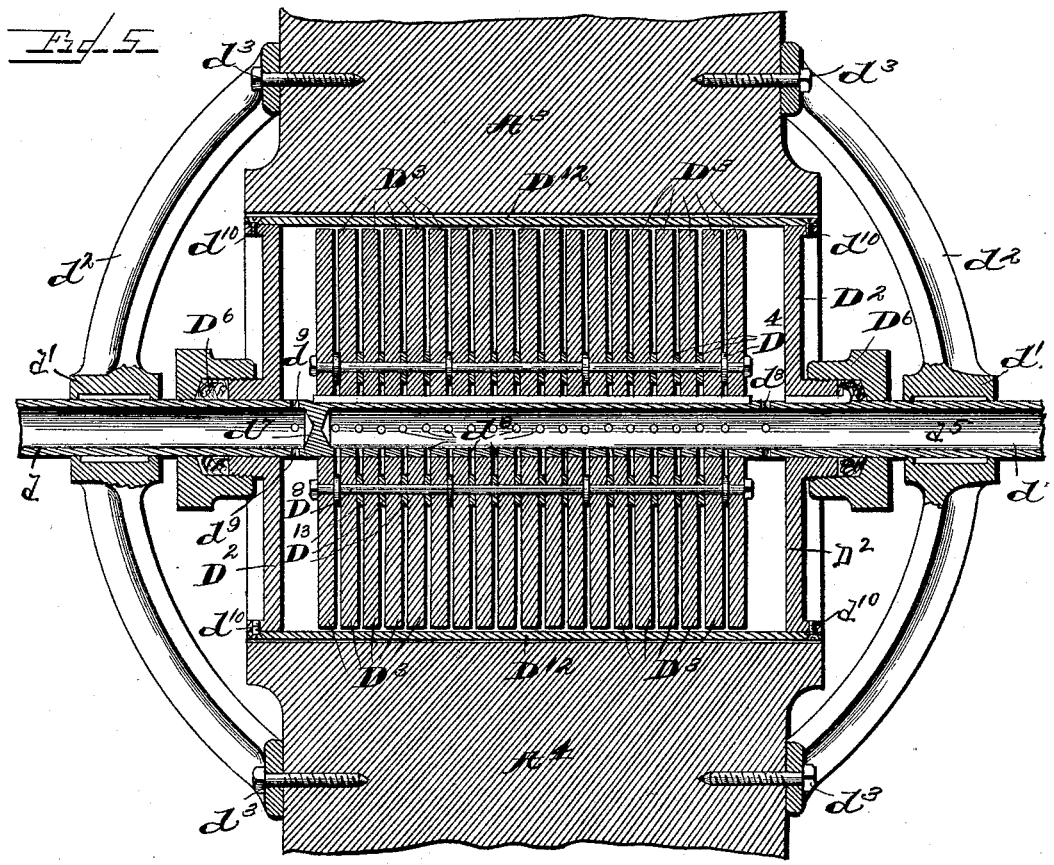
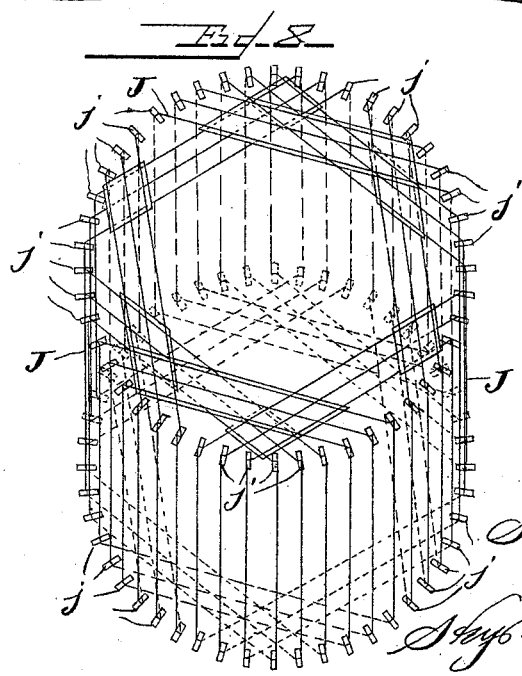
WITNESSES:
H. E. Chase,
E. Schounck.
INVENTOR
Herman B. Collins
BY
Wilkinson Parsons
ATTORNEYS.

(No Model.)  6 Sheets—Sheet 5.
H. B. COLLINS.
DYNAMIC ELECTRIC HEATER.
No. 527,050. Patented Oct. 9, 1894.
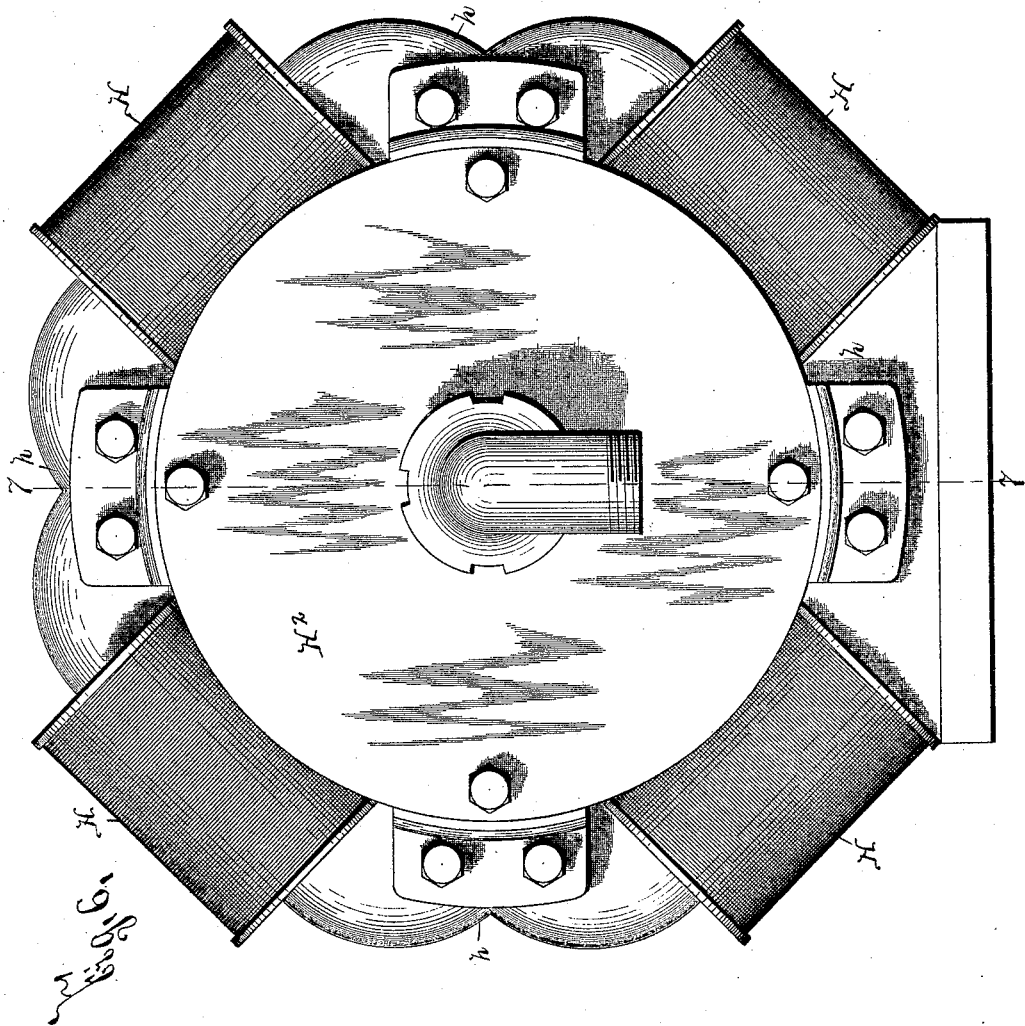
WITNESSES:
INVENTOR
ATTORNEYS.

(No Model.) 6 Sheets—Sheet 6.
H. B. COLLINS.
DYNAMIC ELECTRIC HEATER.
No. 527,050. Patented Oct. 9, 1894.
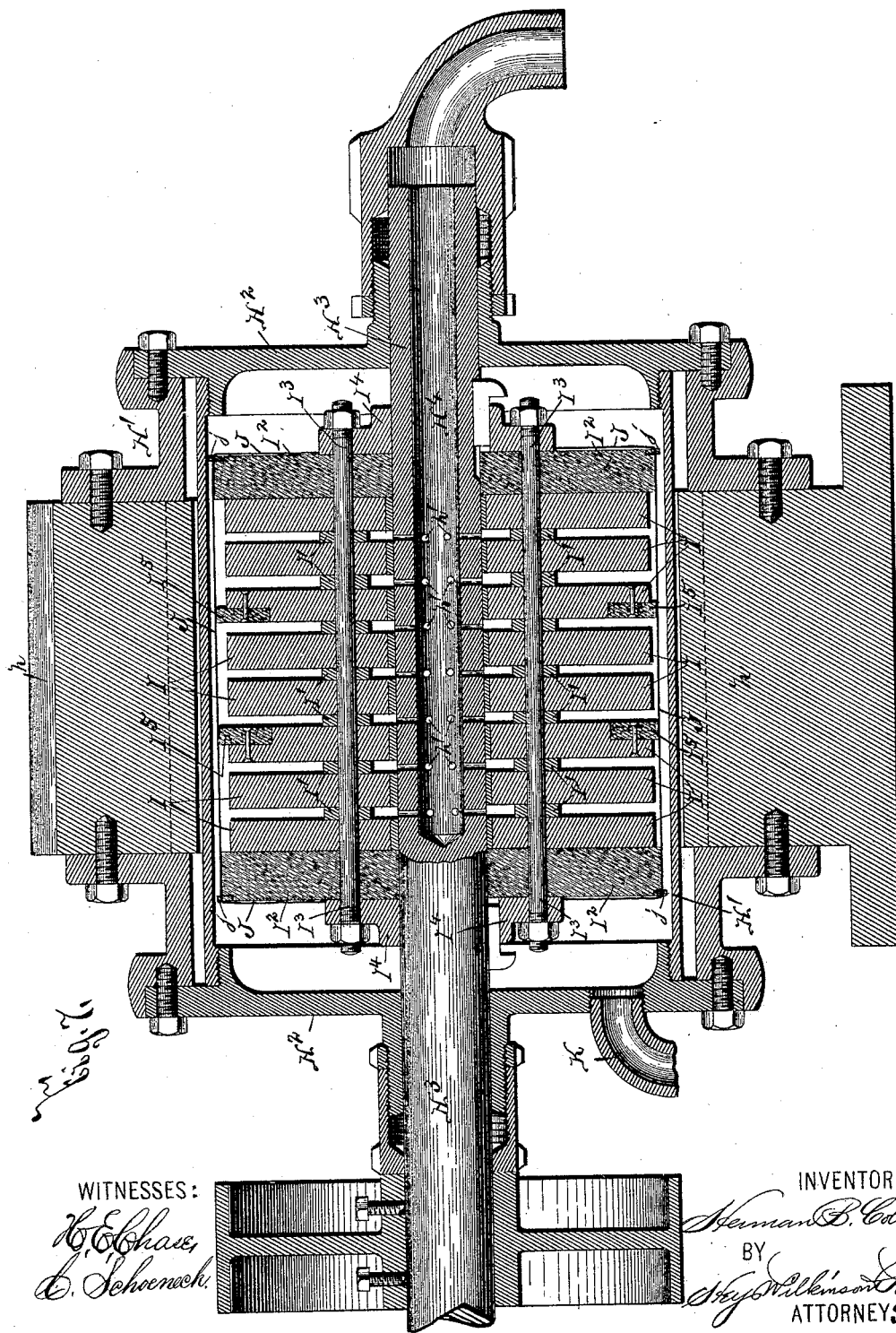
WITNESSES:
INVENTOR
ATTORNEYS.

UNITED STATES PATENT OFFICE.

HERMAN B. COLLINS, OF FULTON, ASSIGNOR OF ONE-HALF TO WARREN H. BOLES, OF SYRACUSE, NEW YORK.

DYNAMIC ELECTRIC HEATER.

SPECIFICATION forming part of Letters Patent No. 527,050, dated October 9, 1894.

Application filed September 22, 1892. Serial No. 446,600. (No model.)

*To all whom it may concern:*

Be it known that I, HERMAN B. COLLINS, of Fulton, in the county of Oswego, in the State of New York, have invented new and useful Improvements in Dynamic Electric Heaters, of which the following, taken in connection with the accompanying drawings, is a full, clear, and exact description.

My invention relates to improvements in dynamic electric heaters, and has for its object the production of a simple and durable device, which is practical and efficient in operation; and to this end it consists, essentially, in magnetic fields, a short circuited armature arranged in connection with the magnetic fields to cut lines of magnetic force and to generate electric currents and thereby raise the temperature of the electric conductors of the armature and generate heat, and a conduit for a circulating heating fluid, arranged in proximity to and leading from the armature and field magnets, whereby the circulating fluid is heated in proximity to said armature and field magnets, and is conveyed therefrom to any suitable locality where it is desired to utilize the heat stored in the circulating fluid.

The invention furthermore consists in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1:
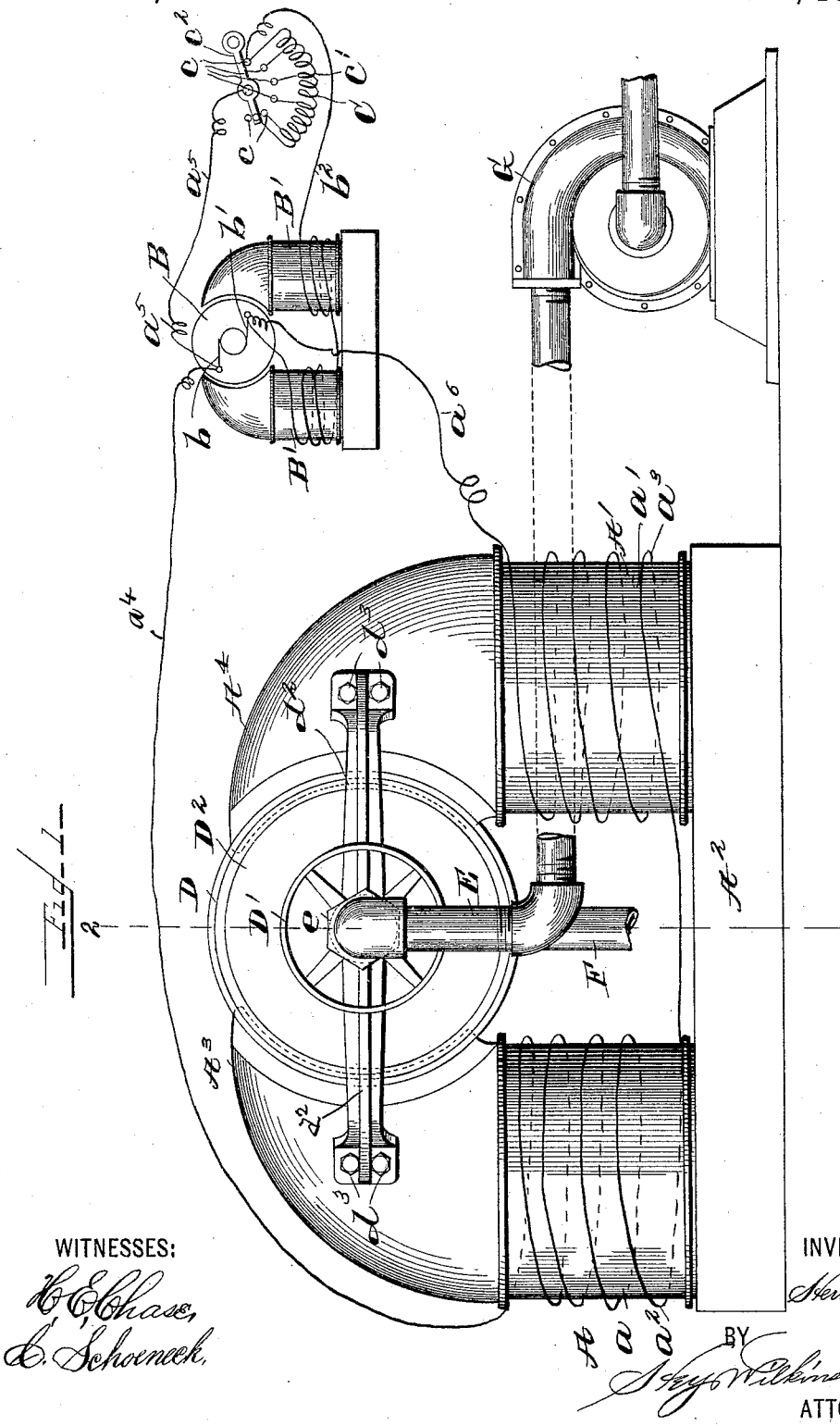
Figure 2:
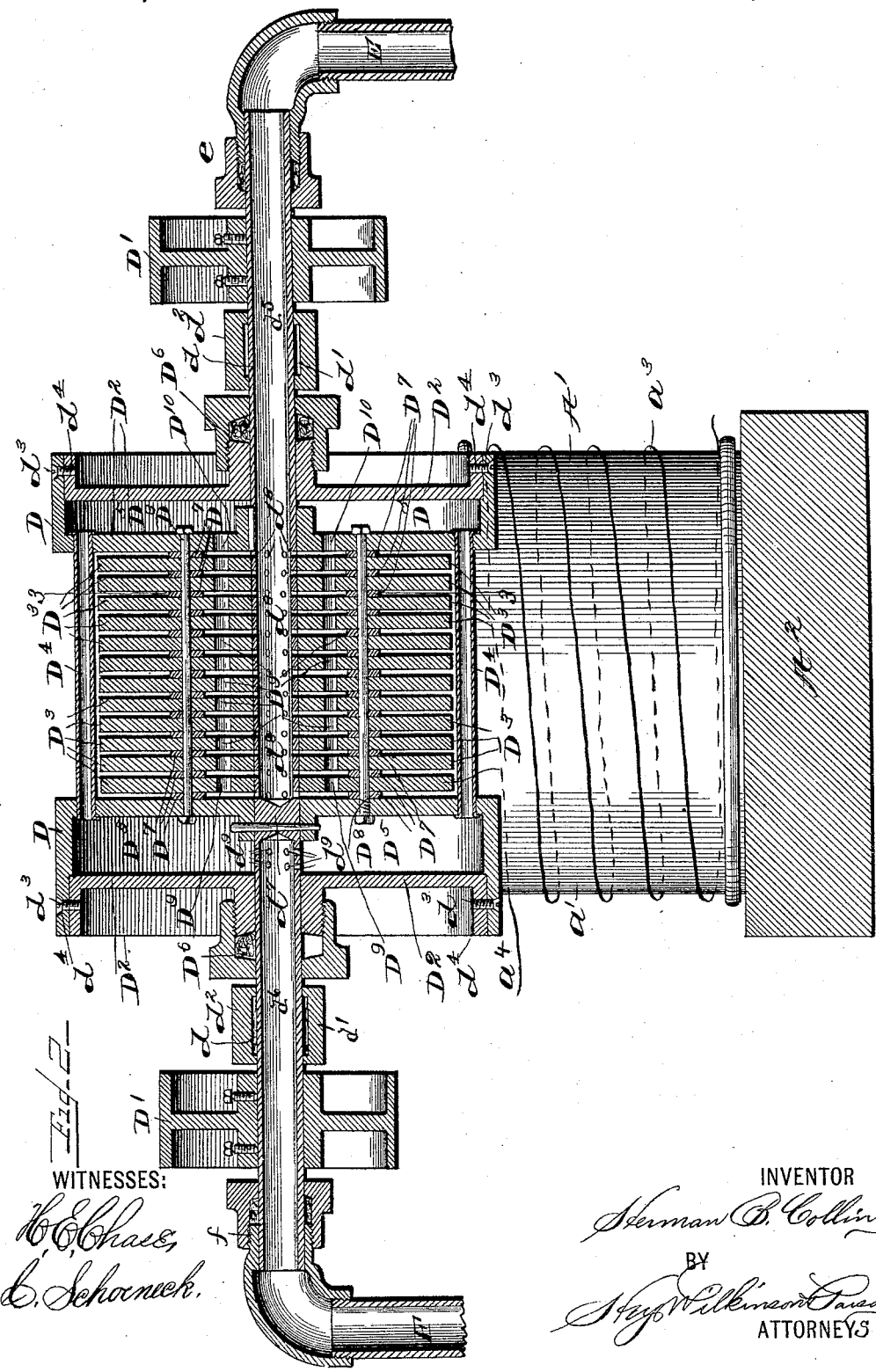
Figure 3:
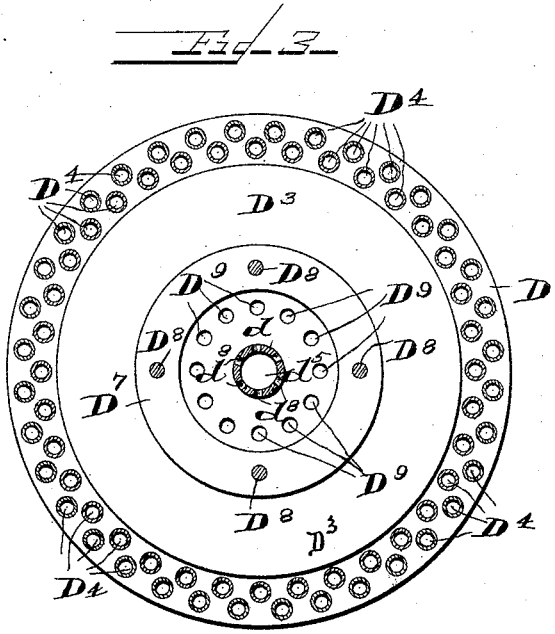
Figure 4:
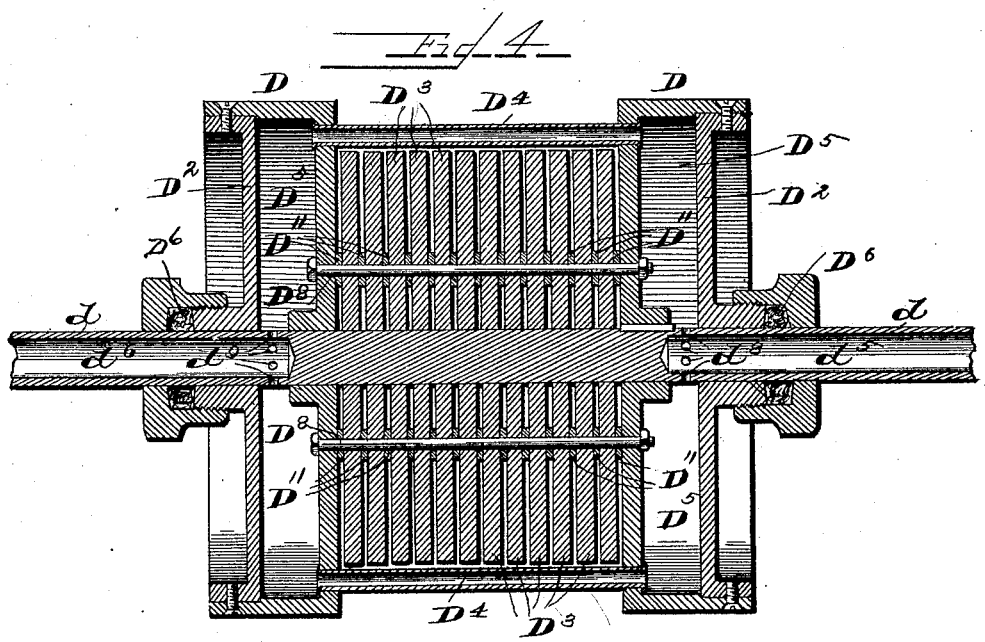

Figure 1 represents an elevation of my invention illustrating the general construction and arrangement of its component parts. Fig. 2 is a longitudinal vertical sectional view, taken on line —2—2—, Fig. 1, illustrating particularly the detail construction and arrangement of the electric heater. Fig. 3 is a transverse sectional view, taken on line —3—3—, Fig. 2. Fig. 4 is a longitudinal vertical sectional view of a slightly modified form of my invention. Fig. 5 is a horizontal sectional view of an additional modified form of my invention. Fig. 6 is an end elevation of a still further modified form of my electric heater. Fig. 7 is a longitudinal vertical sectional view, taken on line —7—7—, Fig. 6, and Fig. 8 is an isometric perspective of the preferable form of wiring for the construction of armature shown at Figs. 6 and 7.

I am aware that electric heaters have been devised in which the heat has been produced by a current of electricity passed through a resistance wire, and has then been utilized either by radiation or by a circulating current of air. I am also aware that in the early art of the manufacture of dynamo electric machines, fluids were sometimes passed through the cores of the armatures to reduce the heat incidentally generated by the revolution of the armatures, but such a construction for this purpose is now rendered unnecessary by the general use of laminated cores and it is well known that the object of such machines was to generate electricity and force the same to a point remote from the dynamo electric machine, and that any heat generated in the operation of the machines, reduced their efficiency and was an unintended and undesirable result. My present invention is, however, entirely differentiated from these styles of electric heaters, or dynamo electric machines, in that, the heat is produced by field magnets and a short circuited armature so arranged in connection with each other that the armature cuts lines of magnetic force, and generates electric currents which are used locally in the machine to raise the temperature of the electric conductors and armature, thereby generating heat which is then absorbed by a circulating current of water, oil, or other fluid.

—A—A'— represent the field magnets of my heater, which are composed in the usual manner of soft iron cores —$a$—$a'$—, and wire coils —$a^2$—$a^3$— encircling said cores. The cores —$a$—$a'$— are attached at their base to a suitable supporting plate —$A^2$—, and their opposite extremities are formed with the usual separated pole pieces —$A^3$—$A^4$—.

—B— is a suitable exciter of any suitable construction, and —C— a rheostat, which is also of any suitable construction, and is formed with separated terminals —$c$—, resistance coils —$c'$— between said terminals, and a switch lever —$c^2$— for making contact with the terminals.

One brush —$b$— of the exciter —B— is connected in the usual manner by a wire —$a^4$— to the coil —$a^2$— and by a wire —$a^5$— to the switch lever —$c^2$— of the rheostat. The other brush —$b'$— of the exciter is connected to the terminals —$c$— and resistance coil —$c'$— of the rheostat —C— by a wire —$b^2$— coiled around the cores of the field magnets —B'—B'— of the exciter, and is connected also by a wire —$a^6$— to the coil —$a^3$— of the field magnet —A'—.

I have shown the described construction of exciter and rheostat as an aid in clearly elucidating my invention, but it will be understood that any other desired form of exciter or rheostat may be used, or that the field magnets may be excited or controlled in any other practical manner.

—D— is the armature of my improved electric heater, and, as clearly shown at Fig. 1, this armature is supported between the pole pieces —$A^3$—$A^4$— of the field magnets —A—A'— in the same manner as an armature is supported between the pole pieces of the field magnets of an electric dynamo or motor. Although the field magnets of my invention may be of any desirable form and construction, the armature is short circuited, as will be readily perceived from the drawings and the following description, and is of special construction in order to render the operation of the heater practical and efficient.

The armature —D— is mounted upon a shaft —$d$—, which is journaled at its opposite extremities in the journal bearings —$d'$—$d'$— of brackets —$d^2$—$d^2$— extending outwardly from the opposite end sides of the pole pieces —$A^3$—$A^4$— and rigidly secured thereto by bolts or other clamps —$d^3$—$d^3$—. Upon the opposite extremities of the shaft —$d$— are pulleys or other suitable power transmitting mechanisms —D'—D'— for revolving the shaft and rotating the armature between the pole pieces —$A^3$—$A^4$—, thus generating a current of electricity in the same manner as the rotation of the armature of a dynamo between its field magnets. These pulleys —D'—D'— are revolved by any suitable construction of power mechanism, although I prefer to use my invention in connection with water power, as the same is usually exceedingly cheap, and renders the operation of my invention more practical by reducing the cost of operating the same.

The armature —D— is composed of circular electric conducting heads —$D^2$—$D^2$— at its opposite extremities, thin circular plates —$D^3$— between said heads, and tubes —$D^4$— arranged around the peripheral face of the plates —$D^3$— with their opposite extremities secured to the adjacent or inner walls of the opposite heads —$D^2$—$D^2$— and forming comparatively short electric conductors or paths between said heads. The heads —$D^2$—$D^2$— are preferably formed with inner conduits or chambers —$D^5$—$D^5$—, are composed of brass or other suitable material, and are rigidly secured upon the shaft —$d$—, which passes through stuffing boxes —$D^6$—$D^6$— on the outer walls of said heads.

The plates —$D^3$— are formed of iron or other suitable magnetic material, and are separated from the adjacent or inner walls of the heads —$D^2$—$D^2$— and from each other, by circular insulating rings —$D^7$—, Figs. 2 and 3. Bolts —$D^8$— are passed through the inner walls of the heads —$D^2$—$D^2$— and through the circular plates —$D^3$—, and the insulating rings —$D^7$—, for firmly securing said parts together.

As shown at Fig. 2 the central portions of the plates —$D^3$—, or the portions thereof within the rings —$D^7$—, are formed with correspondingly arranged perforations —$D^9$—, and the inner wall of the right-hand head —$D^2$— is formed with similar openings —$D^{10}$— aligned with the perforations —$D^9$—.

The tubes —$D^4$— are formed of copper, iron, or other suitable electric conducting material, and, as previously stated, their opposite ends are secured to the adjacent walls of the heads —$D^2$—$D^2$— for producing a number of short electric paths through said tubes and disks and short circuiting the armature. These opposite ends are, however, passed through said walls in order to connect the conduits or chambers —$D^5$—$D^5$—, and are secured preferably by flanging their outer edges upon the inner faces of the inner walls of said heads —$D^2$—$D^2$—.

In order to facilitate securement together of the heads —$D^2$—$D^2$—, the plates —$D^3$—, and the tubes —$D^4$—, the outer walls of the heads —$D^2$—$D^2$— are removably secured by screws or other suitable means —$d^3$— to the peripheral walls —$d^4$— of said heads.

As previously stated the armature —D— is revolved between the pole pieces of the field magnets —A—A'—, and, as the tubes —$D^4$— are electric conductors of comparatively low resistance and are short circuited by the heads —$D^2$—$D^2$—, induced electric currents of great volume are generated within the tubes —$D^4$— and are used locally for greatly heating said tubes.

The armature shaft —$d$— is formed at one end with an inlet chamber —$d^5$—, and at the other with an outlet chamber —$d^6$— separated from the former chamber by a wall —$d^7$— aligned with the inner wall of the left-hand head —$D^2$—. The portion of the chamber —$d^5$— interposed between the planes of the inner walls of the heads —$D^2$—$D^2$— is formed with a series of apertures —$d^8$— aligned with the spaces between the inner portions of the plates —$D^3$—, and the inner end of the chamber —$d^6$— is provided with a series of apertures —$d^9$— opening from the conduit or chamber —$D^5$— of the left-hand head —$D^2$—.

—E— represents an inlet conduit or pipe secured to the right-hand end of the shaft —$d$— by a suitable stuffing box —$e$— for discharging a circulating current of water, oil, or other fluid within the chamber —$d^5$— of said shaft. —F— is an outlet conduit pipe connected to the opposite end of the shaft —$d$— by a suitable stuffing box —$f$— for conducting the circulating fluid from the chamber —$d^6$— of said shaft. The fluid discharged within the chamber —$d^5$— passes through the perforations —$d^8$—, the spaces between the central portions of the plates —$D^3$—, and the perforations —$D^9$—$D^{10}$— to the conduit or chamber —$D^5$— of the right-hand head —$D^2$—, whence it passes through the tubes —$D^4$— to the conduit or chamber —$D^5$— of the left-hand head —$D^2$—, and thence through the openings —$d^9$— to the chamber —$d^6$—. It will be noted, however, that the rings —$D^7$— serve to confine the circulating fluid within the spaces between the central portions of the plates —$D^3$—, and to prevent the escape of the fluid from the spaces between said plates, and that the pipe —E—, the chamber —$d^5$—, the perforations —$d^8$—, the inclosed portions of the spaces between the plates —$D^3$—, the perforations —$D^9$—$D^{10}$—, the chamber —$D^5$— of the right-hand head —$D^2$—, the tubes —$D^4$—, the chamber —$D^5$— of the left-hand head —$D^2$—, the perforations —$d^9$—, the chamber —$d^6$—, and the pipe —F— form essentially a conduit for the circulating fluid for conducting the fluid to and away from the armature.

As previously stated the tubes —$D^4$— are heated by the passage therethrough of induced electric currents of great volume, used locally for said purpose, and, as the water circulates through said heated tubes and thence through the pipe —F— for conveying the same to any desired locality, the water or fluid absorbs the heat and prevents burning or injury of the tubes —$D^4$—, conveys the heat in a practical and efficient manner to the point where it is desired to utilize the same either by radiation or by any other method.

It will be evident that the amount of heat present in the tubes —$D^4$— for conveyance by the water or other fluid may be regulated by varying the intensity of the field magnets by operating the rheostat in the usual manner, or by varying the speed of the armature. It will also be readily understood that the hysteresis of the revolving armature and the eddy or Foucault currents produced by its revolution between the poles of the magnetic fields serve to increase the practicability of my invention, since additional heat is produced thereby, and is absorbed by the circulating fluid.

At Fig. 1 I have shown a centrifugal pump —G— connected to the pipe —E— for forcing the circulating current therethrough, as it is sometimes desirable to force the current under pressure, but it will be evident that other forms of pumps, a water wheel, a water head, or other pressure device may be used if desired.

At Fig. 4 I have shown in vertical section a modified form of short circuited armature of similar construction to the one shown at Figs. 1, 2, and 3, with the exception that the perforations —$d^8$— in the chamber —$d^5$— of the shaft —$d$— discharge directly into the chamber —$D^5$— of the right-hand head —$D^2$—. With this construction of armature the water is not circulated between the inner ends of the plates —$D^3$—, and said plates are separated from each other by circular washers —$D^{11}$— instead of rings.

At Fig. 5 I have shown in horizontal section a form of short circuited armature in which the opposite heads —$D^2$—$D^2$— are solid, and are secured by suitable fastening means —$d^{10}$— to the opposite ends of a cylindrical inclosing case —$D^{12}$— formed of suitable electric conducting material. The armature plates —$D^3$— are arranged within this cylindrical case —$D^{12}$—, and are insulated one from the other by circular washers —$D^{13}$—. The shaft —$d$— is the same in this figure as the one illustrated at Fig. 2, with the exception that the partition —$d^7$— is slightly thinner. In this construction of armature the course of the circulating fluid is, through the perforations —$d^8$—, between the plates —$D^3$— to the peripheral faces of said plates, and thence between the peripheral faces of said plates, and the inner face of the shell —$D^{12}$— to the left-hand extremity of the armature, and thence through the perforations —$d^9$—. In this device the heat is produced almost entirely by eddy or Foucault currents, and is absorbed and conveyed away by the circulating fluid.

At Figs. 6, 7, and 8 I have shown a further modified form of heat generator having four field magnets —H—H—H—H— and four poles —$h$—$h$—$h$—$h$—, which are arranged on the outside of a stationary cylindrical ring or shell —H'— to the opposite ends of which are secured suitable heads —$H^2$—$H^2$— for forming the ring —H'— into a fluid conduit. A shaft —$H^3$— is journaled in the heads —$H^2$—$H^2$—, and one extremity is formed with a chamber —$H^4$— having radial perforations —$h'$—. Arranged within the ring —H'— is a short circuited armature composed of thin disks —I— formed of magnetic material, which are separated by thin insulating washers or plates —I'—, and are mounted upon and revoluble with the shaft —$H^3$—. At the opposite extremities of the armature on the outside of the disks —I— are insulating disks —$I^2$—, and extending through the disks —I—, the washers —I'—, and the disks —$I^2$— are clamping bolts —$I^3$—, the opposite ends of which are secured to heads —$I^4$— suitably locked to the shaft. Any suitable construction of wiring —J— forming a number of short electric paths is supported upon the insulating disks —$I^2$— and preferably by terminals —$j$— at the outer peripheral edges of said disks. The central portion of the wire stretching between the disks —$I^2$—$I^2$— may be supported by insulating rings —$I^5$— suitably secured to two or more of the disks —I— and arranged with their outer faces projecting beyond the corresponding faces of the disks —I—. The circulating fluid passes from the chamber —$H^4$— through the openings —h'— to the spaces between the conducting disks —I—, thence around the wiring —J—, and finally escapes from the left-hand end of the casing —H'— through a suitable outlet pipe —K— opening from the left-hand head —H²—.

At Fig. 8 I have shown in isometric perspective the detached form of wiring encircling the armature, but it is unnecessary to herein specifically illustrate or describe the same, since it forms no part of my present invention, and may be suitably varied without departing from the spirit thereof. In this modification of my invention I prefer to use as a circulating fluid a non-conductor of electricity, as oil or air, which does not have the slightest tendency to short circuit the exposed or bare wiring —J—, and it will be understood that I may also use oil as a circulating fluid in the previously described forms of my invention.

The construction and operation of my invention will be readily perceived from the foregoing description and upon reference to the drawings, and it will be particularly noted that the same is simple, practical, durable, and efficient; that the circulating fluid absorbs the heat generated in short electric paths of comparatively low resistance of a short circuited armature, is applied directly and practically to the portion of the armature developing the most heat, and is easily circulated through my invention, and that the circulating fluid cools the conducting plates of the armature, thus increasing their capability of magnetism and adding to the efficiency of the heater. It will be evident, however, that my invention is not limited to a revolving armature, since the fields may be caused to revolve around the armature, and that my invention is not limited to the detail construction and arrangement of its parts, since these may be greatly changed without departing from the spirit thereof.

Having thus fully described my invention, what I claim as new, and desire to secure by Letters Patent, is—

1. The herein described heater, the same comprising magnetic fields, a short circuited armature arranged in connection with the magnetic fields to cut lines of magnetic force and generate heat, and a circulating fluid conduit arranged in proximity to said armature and leading away from the same, whereby the circulating fluid therein is heated, substantially as and for the purpose set forth.

2. The herein described heater, the same comprising magnetic fields, a short circuited armature arranged in connection with the magnetic fields to cut lines of magnetic force and generate heat, a circulating fluid conduit arranged in proximity to said armature and leading away from the same, whereby the circulating fluid therein is heated, and suitable mechanism for forcing the fluid through said conductor, substantially as and for the purpose specified.

3. The herein described heater, the same comprising magnetic fields, a hollow short circuited armature arranged in connection with the magnetic fields to cut lines of magnetic force and generate heat, a conduit or pipe for discharging the fluid into the concavity of the armature, and a conduit or pipe for withdrawing the heated fluid from the armature, substantially as and for the purpose set forth.

4. The herein described heater, the same comprising magnetic fields, a hollow short circuited armature arranged in connection with the magnetic fields to cut lines of magnetic force and generate heat, a conduit or pipe for discharging the fluid into the concavity of the armature, a conduit or pipe for withdrawing the heated fluid from the armature, and suitable mechanism for forcing the fluid through said pipes, substantially as and for the purpose specified.

5. The herein described heater, the same comprising magnetic fields, a short circuited armature provided with hollow electric conductors arranged in connection with the magnetic fields to cut lines of magnetic force and generate heat, and fluid conduits for passing a fluid through the hollow electric conductors of the armature, substantially as and for the purpose described.

6. The herein described heater, the same comprising magnetic fields, a short circuited armature formed with conduits or passages extending from its center outward, and provided with hollow electric conductors connected to said conduits or passages and arranged in connection with the magnetic fields to cut lines of magnetic force and generate heat, and fluid conduits for passing a fluid through the conduits or passages of the hollow conductors of the armature, substantially as and for the purpose specified.

7. The herein described heater, the same comprising magnetic fields, a short circuited armature arranged in connection with the magnetic fields to cut lines of magnetic force and generate heat and formed with a pair of conduits or passages at its opposite ends for receiving a circulating fluid, a series of pipes carried by the armature and arranged around its periphery, said pipes being formed of electric conducting material and having their opposite extremities connected to said conduits or chambers for conveying the circulating fluid from one conduit or passage to the other, and conduits or pipes for conveying said fluid toward and away from said end conduits or passages of the armature, substantially as and for the purpose set forth.

8. The herein described heater, the same comprising magnetic fields, a short circuited armature arranged in connection with the magnetic fields to cut lines of magnetic force and generate heat and formed with a pair of conduits or passages at its opposite ends for receiving a circulating fluid, a series of pipes carried by the armature and arranged around its periphery, said pipes being formed of electric conducting material and having their opposite extremities connected to said conduits or chambers for conveying the circulating fluid from one conduit or passage to the other, a hollow shaft for the armature formed with separated chambers connected to the conduits or passages at the ends of the armature, and conduits or pipes for conveying said circulating fluid toward and away from said hollow shaft, substantially as and for the purpose specified.

9. The herein described heater, the same comprising magnetic fields, a short circuited armature arranged in connection with the magnetic fields to cut lines of magnetic force and generate heat and formed with a pair of conduits or passages at its opposite ends for receiving a circulating fluid, a series of pipes carried by the armature and arranged around its periphery, said pipes being formed of electric conducting material and having their opposite extremities connected to said conduits or chambers for conveying the circulating fluid from one conduit or passage to the other, a hollow shaft for the armature formed with separated chambers connected to the conduits or passages at the ends of the armatures, conduits or pipes for conveying said circulating fluid toward and away from said hollow shaft, and suitable mechanism for forcing the circulating fluid under pressure through said pipes, substantially as and for the purpose set forth.

In testimony whereof I have hereunto signed my name, in the presence of two attesting witnesses, at Syracuse, in the county of Onondaga, in the State of New York, this 24th day of August, 1892.

HERMAN B. COLLINS.

Witnesses:
CLARK H. NORTON,
E. A. WEISBURG.